(12) United States Patent
Tachibana

(10) Patent No.: US 11,788,197 B2
(45) Date of Patent: Oct. 17, 2023

(54) HYDROGEN GAS DISSOLVING APPARATUS

(71) Applicant: NIHON TRIM CO., LTD., Osaka (JP)

(72) Inventor: Takahito Tachibana, Nankoku (JP)

(73) Assignee: NIHON TRIM CO., LTD., Osaka (JP)

( * ) Notice: Subject to any disclaimer, the term of this patent is extended or adjusted under 35 U.S.C. 154(b) by 582 days.

(21) Appl. No.: 17/049,437

(22) PCT Filed: Jun. 4, 2019

(86) PCT No.: PCT/JP2019/022158
§ 371 (c)(1),
(2) Date: Oct. 21, 2020

(87) PCT Pub. No.: WO2019/235473
PCT Pub. Date: Dec. 12, 2019

(65) Prior Publication Data
US 2021/0079545 A1 Mar. 18, 2021

(30) Foreign Application Priority Data
Jun. 6, 2018 (JP) ................. 2018-108795

(51) Int. Cl.
*C25B 9/00* (2021.01)
*C25B 15/08* (2006.01)
(Continued)

(52) U.S. Cl.
CPC .............. *C25B 15/08* (2013.01); *B01D 69/08* (2013.01); *B01F 23/2312* (2022.01); *C02F 1/008* (2013.01); *C02F 1/461* (2013.01); *C02F 1/68* (2013.01); *C25B 1/04* (2013.01); *C25B 15/023* (2021.01); *B01F 23/231244* (2022.01); *B01F 2101/48* (2022.01); *C02F 2201/005* (2013.01); *C02F 2209/42* (2013.01)

(58) Field of Classification Search
CPC ......... C25B 15/08; C25B 15/023; C25B 1/04; B01F 23/2312
See application file for complete search history.

(56) References Cited

U.S. PATENT DOCUMENTS 5,690,797 A 11/1997 Harada
6,290,777 B1 9/2001 Imaoka et al.

FOREIGN PATENT DOCUMENTS

CN 1536623 A 10/2004
JP H08-193287 A 7/1996
(Continued)

*Primary Examiner* — Zulmariam Mendez
(74) *Attorney, Agent, or Firm* — Muncy, Geissler, Olds & Lowe, P.C.

(57) ABSTRACT

A hydrogen gas dissolution apparatus 1 to comprises a hydrogen extracting pipe 8 for extracting hydrogen gas from a cathode chamber 40b, a water supply pipe 3 for supplying water for electrolysis, an opening pipe 81 for opening the cathode chamber 40b, a hydrogen gas dissolution module 6 connected to the hydrogen extracting pipe 8, a first open/close valve 91 installed on the above-said water supply pipe 3, a second open/close valve 93 provided on the opening pipe 81, and a control means 10 for controlling the electrolysis tank 7, the first open/close valve 91, and the second open/close valve 93. The control means 10 causes the water to flow for the first and second open/close valves 91 and then start the electrolysis after closing the first open/close valve 91 and the second open/close valve 93.

8 Claims, 3 Drawing Sheets

(51) Int. Cl.
*C25B 15/023* (2021.01)
*B01D 69/08* (2006.01)
*C02F 1/00* (2023.01)
*C02F 1/461* (2023.01)
*C02F 1/68* (2023.01)
*C25B 1/04* (2021.01)
*B01F 23/231* (2022.01)
*B01F 101/48* (2022.01)

(56) References Cited

FOREIGN PATENT DOCUMENTS

| | | | | |
|---|---|---|---|---|
| JP | 2000-297392 | * | 10/2000 | ............... C25B 1/04 |
| JP | 2016-077987 A | | 5/2016 | |
| WO | WO2017077993 | * | 11/2017 | ................ C02F 1/46 |

* cited by examiner

HYDROGEN GAS DISSOLVING APPARATUS

TECHNICAL FIELD

The present invention relates to a hydrogen gas dissolution apparatus for making electrolysis-generated hydrogen gas dissolved in water.

BACKGROUND TECHNOLOGY

In recent years, there has been proposed a hydrogen gas dissolution apparatus in which hydrogen gas generated by electrolysis is dissolved in tap water to produce hydrogen water. For example, Patent Document 1 discloses an apparatus for producing hydrogen water by supplying hydrogen gas and tap water through a gas separation hollow fiber membrane.

The above-mentioned Patent Document 1 describes that it is possible to supply hydrogen water having a concentration higher than a predetermined concentration by adjusting the pressure of the hydrogen gas in accordance with the water temperature and by making the pressure of the hydrogen gas and the pressure of the tap water the same pressure.

As a hydrogen gas generator for generating hydrogen gas by electrolysis of water, an electrolyser is known. In the electrolyser, a water supply pipe for supplying water is connected to each of a cathode chamber and an anode chamber, and an exhaust pipe for exhausting the generated oxygen gas is connected to the anode chamber. Since the inside of the apparatus is not hermetically sealed, it is difficult to increase the pressure of the hydrogen gas produced by the electrolysis of water sufficiently, and a pump to pressurize the hydrogen gas is required, therefore, there is room for improvement in terms of supplying hydrogen water with high dissolved hydrogen concentration.

The above-mentioned Patent Document 1 describes a hydrogen gas generator constituted by an electrolysis, but no special method of increasing the pressure of the hydrogen gas is described.

PRIOR ART DOCUMENT

Patent Document

Patent document 1: Patent Application Publication No. 2016-77987

SUMMARY OF THE INVENTION

Problems to be Solved by the Invention

The present invention was devised in view of the above circumstances, and its primary objective is to provide a hydrogen gas dissolving apparatus capable of supplying hydrogen water having a high dissolved hydrogen concentration with a simple structure.

Means for Solving the Problems

The present invention comprises
an electrolysis tank having
an anode chamber for generating oxygen gas by electrolysis and
a cathode chamber for generating hydrogen gas by the above-said electrolysis,
a hydrogen extracting pipe for extracting the hydrogen gas from the cathode chamber,
an oxygen extracting pipe for extracting the oxygen gas from the anode chamber,
a water supply pipe for supplying water for electrolysis to the anode chamber and the cathode chamber,
an opening pipe for opening the cathode chamber,
a hydrogen gas dissolution module connected to the hydrogen extracting pipe to dissolve the hydrogen gas supplied from the hydrogen extracting pipe by making it contact with water,
a first open/close valve installed on the water supply pipe,
a second open/close valve provided in each of the oxygen extracting pipe and the opening pipe, and
a control means for controlling the electrolysis tank, the first open/close valve, and the second open/close valves,
wherein
the control means causes the water for electrolysis to flow into the anode chamber and the cathode chamber by opening the first open/close valve and the second open/close valves, and then starts the electrolysis after closing the first open/close valve and the second open/close valves.

In the hydrogen gas dissolution apparatus, it is preferable that at least one of the hydrogen extracting pipe and the oxygen extracting pipe is provided with a first water level detection means for detecting the water level in the pipe, and the control means closes the first open/close valve and the second open/close valve when a rise in the water level in the pipe is detected by the first water level detection means, and starts the electrolysis.

It is preferable that the hydrogen gas dissolution apparatus is further provided with a water supply means for supplying the water to the hydrogen gas dissolution module, and the water is supplied to the water supply pipe and the water supply means from a water source of the same system.

In the hydrogen gas dissolution apparatus, it is preferable that the hydrogen gas dissolution module has a tube body for passing the water supplied from the water supply means, and the tube body is composed of a porous membrane which allows the hydrogen gas to pass through.

In the hydrogen gas dissolution apparatus, it is preferable that the porous membrane is a hollow fiber membrane.

Effect of the Invention

In the present invention, the water for electrolysis flows into the anode chamber and the cathode chamber by opening the first open/close valve and the second open/close valve, the electrolysis starts by closing the first open/close valve and the second open/close valve.

As the hydrogen gas is generated by the electrolysis, the pressure of the hydrogen gas in the hydrogen extracting pipe rises, and the hydrogen gas dissolution module is pressurized. Therefore, the dissolved hydrogen concentration can be increased with a simple structure without installing a pump or the like in the hydrogen extracting pipe.

MODE FOR CARRYING OUT THE INVENTION

An embodiment of the present invention will be described below in accordance with the drawings.

Figure 1:
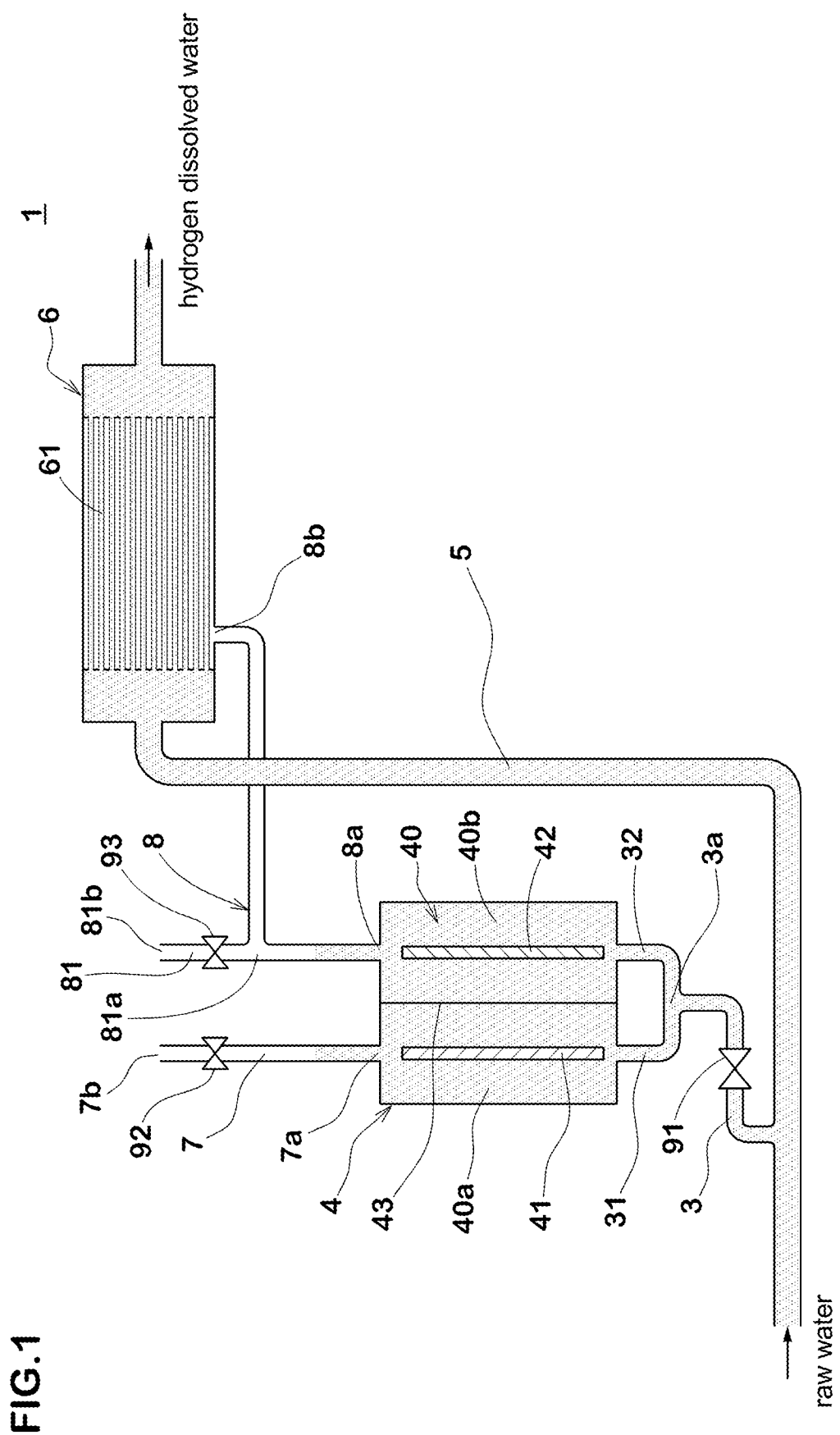
FIG. 1 A figure schematically showing a hydrogen gas dissolution apparatus as an embodiment of the present invention.

FIG. 1 shows a schematic configuration of the hydrogen gas dissolution apparatus 1 in the present embodiment.

In the same figure, the shaded area is an area filled with water (the same will apply to FIG. 3 below).

The hydrogen gas dissolution apparatus 1 is equipped with an electrolysis tank 4 and a hydrogen gas dissolution module 6.

In the electrolysis tank 4, hydrogen gas is generated by electrolysis.

The hydrogen gas dissolution module 6 dissolves the hydrogen gas supplied from the electrolysis tank 4 by bringing it into contact with water.

Thereby, it is possible to produce hydrogen dissolved water with a simple structure, which is available in hemodialysis and as drinking water, In the inside of the electrolysis tank 4, an electrolysis chamber 40 is formed.

In the electrolysis chamber 40, there are disposed an anode feed body 41, a cathode feed body 42, and a diaphragm 43.

The electrolysis chamber 40 is divided by the separating membrane 43 into an anode chamber 40a on the anode feed body 41 side, and a cathode chamber 40b on the cathode feed body 42 side.

For example, a solid polymeric material comprising a fluorinated resin having a sulfonic acid group or the like is appropriately used for the diaphragm 43.

Although, the diaphragm 43 may be eliminated, it is preferred that the electrolysis chamber 40 is separated by the diaphragm 43 into the anode chamber 40a and the cathode chamber 40b in order to make the electrolysis efficiently in the inside of the electrolysis tank 4.

Water for electrolysis is supplied to the anode chamber 40a and the cathode chamber 40b.

When a direct current voltage for electrolysis is applied between the anode feed body 41 and the cathode feed body 42, the water is electrolyzed in the anode chamber 40a and the cathode chamber 40b, generating oxygen gas in the anode chamber 40a and hydrogen gas in the cathode chamber 40b.

In the present embodiment, there is further provided with a water supply pipe 3 for supplying water for electrolysis to the anode chamber 40a and the cathode chamber 40b.

It is also possible to configure such that the water for electrolysis is supplied from the undermentioned oxygen extracting pipe 7 and hydrogen extracting pipe 8.

The water supply pipe 3 branches into a water supply pipe 31 and a water supply pipe 32 at a bifurcation portion 3a.

The water supply pipe 31 is connected to the anode chamber 40a, and the water supply pipe 32 is connected to the cathode chamber 40b.

The water supply pipe 3 upstream of the bifurcation portion 3a is provided with an open/close valve 91 (first open/close valve).

The hydrogen gas dissolution apparatus 1 is further provided with a water supply means for supplying water to the hydrogen gas dissolution module 6.

The water supply means includes a water supply pipe 5.

In the present embodiment, the water supply pipe 3 is branched from the water supply pipe 5. Accordingly, the water supply pipe 3 and the water supply pipe 5 are supplied with water from a water source of the same system. Thereby, the structure of the hydrogen gas dissolution apparatus 1 is simplified.

It may be also possible that the water source of the water supply pipe 3 and the water source of the water supply pipe 5 are separate systems.

The cathode chamber 40b and the hydrogen gas dissolution module 6 are connected by the undermentioned hydrogen extracting pipe 8. The hydrogen gas produced in the cathode chamber 40b is supplied to the hydrogen gas dissolution module 6 via the hydrogen extracting pipe 8.

The hydrogen gas dissolution module 6 has a tube body 61 for passing water supplied from the water supply pipe 5.

In the present embodiment, a plurality of tube bodies 61 are disposed inside the hydrogen gas dissolution module 6.

The tube bodies 61 are extended in a horizontal direction.

The tube body 61 is composed of a porous membrane which is hydrogen gas permeable. Thereby, the hydrogen gas supplied from the cathode chamber 40b permeates through the tube body 61, and comes into contact with and dissolves in the water in the tube body 61.

In the present embodiment, a hollow fiber membrane is used as the porous membrane constituting the tube body 61.

The hollow fiber membrane has innumerable micropores which allow hydrogen gas to permeate therethrough.

In the present embodiment, the external pressure of the tube body 61 is increased by the hydrogen gas generated in the cathode chamber 40b, which causes the hydrogen gas existing outside the tube body 61 to move inward and dissolve in the water in the tube. Hydrogen dissolved water is easily obtained.

Figure 2:
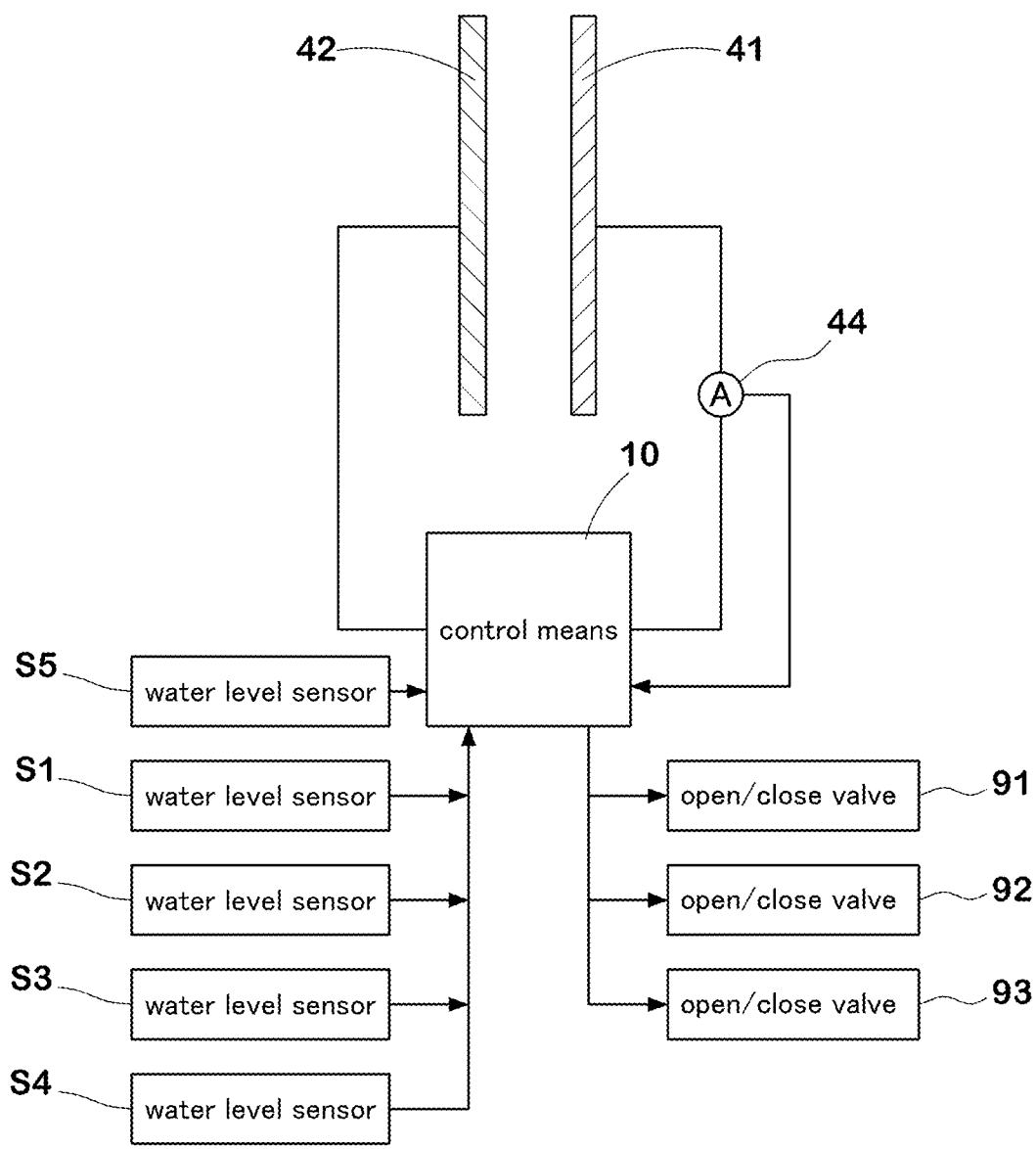
FIG. 2 A block diagram showing an electrical configuration of the hydrogen gas dissolution apparatus.

FIG. 2 shows an electrical configuration of the hydrogen gas dissolution apparatus 1.

The hydrogen gas dissolution apparatus 1 is equipped with a control means 10 which controls each of the anode feed body 41, the cathode feed body 42 and other parts.

The control means 10 has, for example,
a CPU (Central Processing unit) for executing various arithmetic processing, information processing, and the like, and
a memory for storing programs and various information for controlling the operation of the CPU.

A current supply line between the anode feed body 41 and the control means 10 is provided with a current sensing means 44. The current sensing means 44 may be provided in a current supply line between the cathode feed body 42 and the control means 10. The current sensing means 44 detects the electrolytic current supplied to the anode feed body 41 and the cathode feed body 42 and outputs an electrical signal corresponding to the value of the electrolytic current, to the control means 10.

Based on the electrical signal output from the current sensing means 44, the control means 10 controls, for example, a DC voltage applied to the anode feed body 41 and the cathode feed body 42.

More specifically, the control means 10 controls the DC voltage applied to the anode feed body 41 and the cathode feed body 42 by feedback control so that the electrolysis current detected by the current sensing means 44 becomes a desired value according to a dissolved hydrogen concentration set by the user or the like.

For example, if the electrolytic current is excessively large, the control means 10 decreases the above voltage. If the electrolytic current is excessively small, the control means 10 increases the above voltage. This allows the electrolytic current supplied to the anode feed body 41 and the cathode feed body 42 to be properly controlled.

The hydrogen gas dissolution apparatus 1 in the present embodiment has the oxygen extracting pipe 7 for extracting oxygen gas from the anode chamber 40a of the electrolysis tank 4. The oxygen extracting pipe 7 has an inlet 7a on the side of the anode chamber 40a of the electrolysis tank 4, and an outlet 7b opened within the hydrogen gas dissolution apparatus 1.

It is preferable that the inlet 7a is located above the anode chamber 40a of the electrolysis tank 4. Thereby, the hydrogen gas generated in the anode chamber 40a is facilitated to flow out into the oxygen extracting pipe 7 from the inlet 7a by the water pressure in the anode chamber 40a.

The outlet 7b is provided at an end of the oxygen extracting pipe 7. The oxygen extracting pipe 7 may be arbitrarily extended so that the outlet 7b is opened outside the hydrogen gas dissolution apparatus 1.

The hydrogen gas dissolution apparatus 1 is provided with the hydrogen extracting pipe 8 for extracting hydrogen gas from the electrolysis tank 4. It has an inlet 8a connected to the cathode chamber 40b of the electrolysis tank 4, and an outlet 8b connected to the hydrogen gas dissolution module 6.

The hydrogen extracting pipe 8 supplies the hydrogen gas generated in the cathode chamber 40b to the hydrogen gas dissolution module 6.

It is preferable that the inlet 8a is located at the upper part of the cathode chamber 40b of the electrolysis tank 4.

This makes it easier for the hydrogen gas generated in the cathode chamber 40b to flow from the inlet 8a into the hydrogen extracting pipe 8 due to the water pressure in the cathode chamber 40b.

It is preferable that the outlet 8b is connected and opened to the lower part of the hydrogen gas dissolution module 6.

This facilitates the low specific gravity hydrogen gas flowing into the hydrogen extracting pipe 8 from the cathode chamber 40b to rise and flow into the hydrogen gas dissolution module 6.

The hydrogen extracting pipe 8 is connected to an opening pipe 81 whose end 81b is opened and which is branched from the hydrogen extracting pipe 8 at a bifurcation portion 81a.

The opening pipe 81 is provided to open the cathode chamber 40b. Therefore, it may be possible that the opening pipe 81 is provided independently of the hydrogen extracting pipe 8 and directly connected to the cathode chamber 40b.

The opening pipe 81 may be arbitrarily extended so that the end 81b is opened outside the hydrogen gas dissolution apparatus 1.

An open/close valve 92 (second open/close valve) is provided near the outlet 7b of the oxygen extracting pipe 7 connected to the anode chamber 40a.

An open/close valve 93 (second open/close valve) is provided near the end 81b of the opening pipe 81 branching from the hydrogen extracting pipe 8 connected to the cathode chamber 40b. The open/close valve 92 is provided to discharge the gas in the oxygen extracting pipe 7.

The open/close valve 93 is provided to discharge the gas in the hydrogen extracting pipe 8.

As the electrolysis generating hydrogen gas proceeds, the water in the electrolysis chamber 40 is consumed.

At this time, by opening the open/close valves 91, 92 and 93, water is supplied to the electrolysis chamber 40 from the water supply pipe 3 due to the difference in the internal pressure between the water supply pipe 3 and the oxygen extracting pipe 7 and the hydrogen extracting pipe 8.

Figure 3:
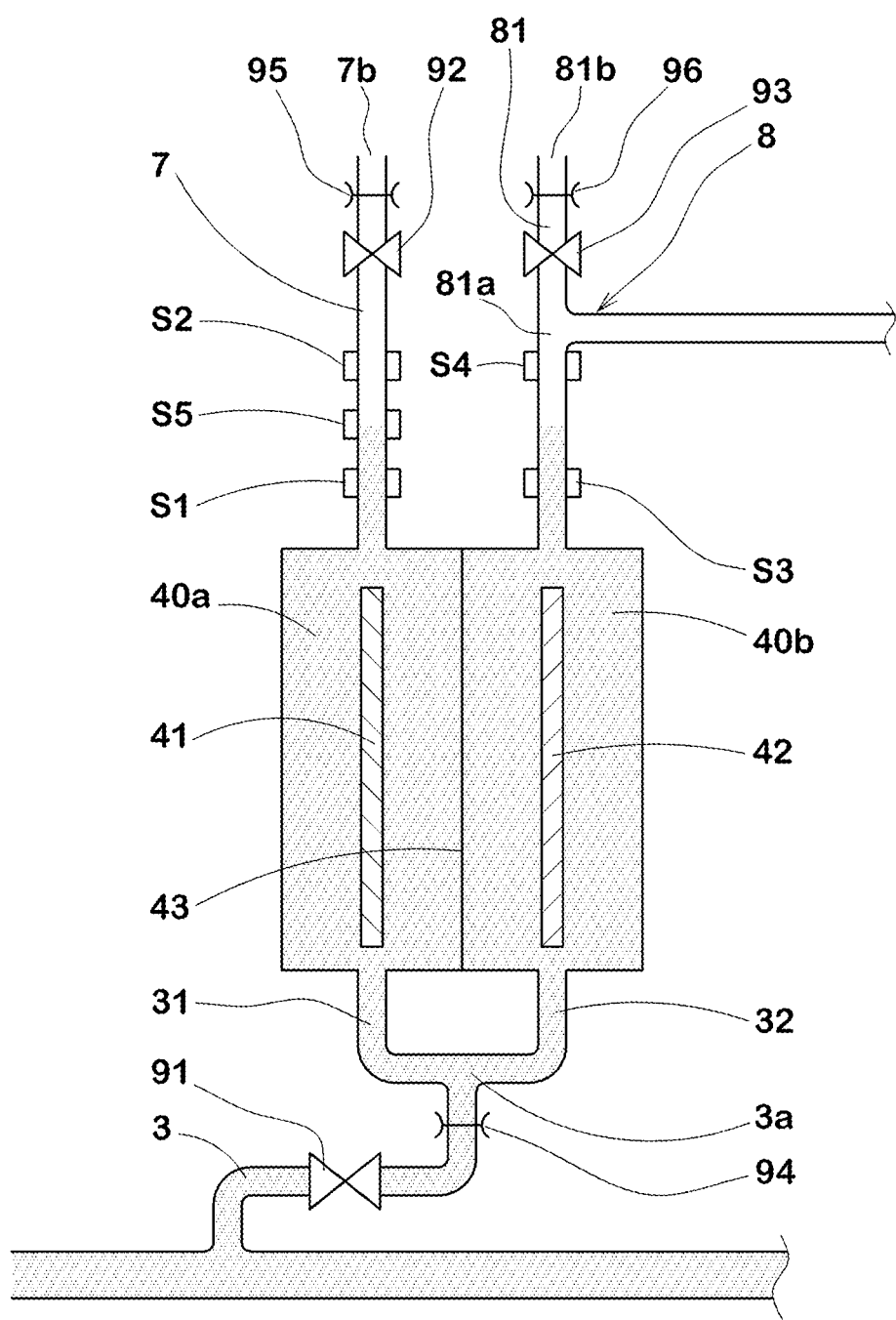
FIG. 3 A figure showing a configuration of the electrolysis tank of the hydrogen gas dissolution apparatus and its surroundings.

FIG. 3 shows a configuration of the electrolysis tank and its surroundings.

It is desirable that the anode chamber 40a and the cathode chamber 40b are maintained in a state of full water at any time in order that the electrolysis is performed efficiently in the electrolysis tank 4. Therefore, in the present embodiment, water is supplied from the water supply pipe 3 to the anode chamber 40a and the cathode chamber 40b prior to the electrolysis.

In the present embodiment, as the water supply pipe 31 and the water supply pipe 32 are connected to each other at the bifurcation portion 3a, the water level in the oxygen extracting pipe 7 becomes equal to the water level in the hydrogen extracting pipe 8.

The open/close valves 91, 92 and 93 are, for example, composed of electromagnetic valves, and are controlled by the control means 10 to work in conjunction with each other.

For example, when the control means 10 open the open/close valves 91, 92 and 93, the water pressure of the water supplied from the water supply pipe 31 discharges gas from the oxygen extracting pipe 7 and the hydrogen extracting pipe 8, and the water levels of the oxygen extracting pipe 7 and the hydrogen extracting pipe 8 are raised.

As a result, the water levels of the oxygen extracting pipe 7 and the hydrogen extracting pipe 8, which are lowered by the electrolysis, can be raised in advance.

Furthermore, the control means 10 starts the electrolysis by applying a DC voltage for electrolysis to the anode feed body 41 and the cathode feed body 42 after closing of the open/close valves 91, 92, 93. That is, in a state where the open/close valves 91, 92, 93 are closed, the electrolysis is progressed in the electrolysis chamber 40, and hydrogen gas is generated in the cathode chamber 40b.

As a result, without the need to install a pump or other complex configuration in the hydrogen extracting pipe 8, the hydrogen gas in the hydrogen extracting pipe 8 is increased in the pressure, and pressurizes the tube body(bodies) 61 of the hydrogen gas dissolution module 6 from the outside.

Accordingly, the hydrogen gas in contact with the water within the hydrogen gas dissolution module 6 is increased, which makes it possible to supply hydrogen dissolved water having a high dissolved hydrogen concentration at a low cost with a simple structure.

As a configuration for properly maintaining the water level in the oxygen extracting pipe 7 and the water level in the hydrogen extracting pipe 8, the hydrogen gas dissolution apparatus 1 in the present embodiment is equipped with water level sensors (water level detection means) S1, S2, S3, S4 and S5 and the above-said open/close valves 91, 92 and 93

The water level sensors S1 and S2 are arranged up and down at an appropriate interval on the oxygen extracting pipe 7.

The water level sensor S5 is disposed between the water level sensor S1 and the water level sensor S2.

The water level sensors S1, S2 and S5 detect the water in the pipe by an optical manner or buoyancy, and output to the control means 10 the corresponding electrical signals.

Based on the electrical signals input from the water level sensors S1, S2 and S5, the control means 10 knows and obtains the water level in the oxygen extracting pipe 7.

Similarly, the water level sensors S3 and S4 are arranged up and drawn at an appropriate interval on the hydrogen extracting pipe 8. The water level sensors S3 and S4 detect water in the pipe by an optical manner or buoyancy, and output to the control means 10 the corresponding electrical signals.

Based on the electrical signals input from the water level sensors S3 and S4, the control means 10 knows and obtains the water level in the hydrogen extracting pipe 8.

The water level sensors S1 and S3 are located at the same height. The water level sensors S2 and S4 are located at the same height. The water level sensor S5 may be disposed on the hydrogen extracting pipe 8. In this case, the water level sensor S5 is located between the water level sensor S3 and the water level sensor S4.

The water level sensor S4 is disposed below the bifurcation portion 81a. Thereby, when supplying water for electrolysis to the cathode chamber 40b, the water is prevented from entering into the hydrogen extracting pipe 8 on the hydrogen gas dissolution module 6 side than the bifurcation portion 81a.

By opening the open/close valves 91, 92 and 93, the water level in the oxygen extracting pipe 7 and the water level in the hydrogen extracting pipe 8 rise while maintaining the same height.

When it is detected by the electrical signal output from the water level sensor S5 that the water level in the oxygen extracting pipe 7 has risen properly (to the height of the water level sensor S5), the control means 10 closes the open/close valves 91, 92, 93. This completes the replenishment of water into the electrolysis tank 4.

As the electrolysis progresses, the water level in the oxygen extracting pipe 7 and the water level in the hydrogen extracting pipe 8 are changed at different heights.

When a fall or rise in the water level is detected by the electrical signals output from the water level sensors S1 to S4, the control means 10 stops applying the electrolytic voltage to the anode feed body 41 and the cathode feed body 42.

More specifically, the control means 10 stops the electrolysis when a drop in the water level in the oxygen extracting pipe 7 is detected by an electrical signal output from the water level sensor S1, or when a rise in the water level in the oxygen extracting pipe 7 is detected by an electrical signal output from the water level sensor S2.

Further, the control means 10 stops the electrolysis when a drop in the water level in the hydrogen extracting pipe 8 is detected by the electrical signal output from the water level sensor S3, or when a rise in the water level in the hydrogen extracting pipe 8 is detected by the electrical signal output from the water level sensor S4.

Furthermore, the control means 10 opens the open/close valves 92 and 93. Thereby, the pressure of the anode chamber 40a and the cathode chamber 40b becomes equal to the atmospheric pressure, and the water level in the oxygen extracting pipe 7 becomes equal to the water level in the hydrogen extracting pipe 8. When a drop in the water level in the oxygen extracting pipe 7 is detected by the electrical signal output from the water level sensor S5, the open/close valve 91 is opened and the water is replenished. Thereby, the water level in the hydrogen extracting pipe 8 is maintained between the water level sensors S3 and S4.

The control means 10 starts the electrolysis by applying a DC voltage for electrolysis to the anode feed body 41 and the cathode feed body 42 after closing the open/close valves 91, 92 and 93. That is, in such a state that the open/close valves 91, 92 and 93 have been closed, the electrolysis is progressed in the electrolysis chamber 40, and hydrogen gas is generated in the cathode chamber 40b. With this, the pressure in the hydrogen extracting pipe 8 increases and pressurizes the hydrogen gas dissolution module 6.

It is preferable that the water level in the hydrogen extracting pipe 8 is kept lower than the outlet 8b by controlling the open/close valves 91, 92 and 93 by the control means 10.

Thereby, the water supplied from the water supply pipe 32 is prevented from flowing into the hydrogen gas dissolution module 6.

The hydrogen extracting pipe 8 may be provided with an open/close valve (not shown). This open/close valve is closed when the water for electrolysis is supplied to the cathode chamber 40b. This further prevents the water supplied from the water supply pipe 32 from flowing into the hydrogen gas dissolution module 6.

By the way, when the open/close valves 91, 92 and 93 are opened, there is a possibility that water flows vigorously into the electrolysis chamber 40 from the water supply pipe 3, and flow out of the outlet 7b and the end 81b.

Therefore, in the present hydrogen gas dissolution apparatus 1, it is desirable that the water supply pipe 3 is provided with a throttling valve 94 between the open/close valve 91 and the bifurcation portion 3a in order to limit the amount of water flowing through the water supply pipe 3. The throttling valve 94 inhibits the water supplied to the electrolysis chamber 40, from flowing out of the outlet 7b and the end 81b.

In the hydrogen gas dissolution apparatus 1, it is desirable that the oxygen extracting pipe 7 is provided, between the open/close valve 92 and the outlet 7b, with a throttling valve 95 to limit the amount of water flowing through the oxygen extracting pipe 7.

Similarly, it is desirable that the opening pipe 81 is provided, between the open/close valve 93 and the end 81b, with a throttling valve 96 to limit the amount of water flowing through the opening pipe 81.

The throttling valves 95 and 96 inhibit the water supplied to the electrolysis chamber 40 from flowing out of the outlet 7b and the end 81b.

If the outflow of water from the outlet 7b and the end 81b can be sufficiently controlled by the throttling valve 94 alone, the throttling valves 95 and 96 may be omitted.

When the hydrogen dissolved water produced by the hydrogen gas dissolution apparatus 1 is used for blood dialysis, reverse osmosis water treated by a reverse osmosis membrane treatment apparatus (not shown) is supplied to the water supply pipe 5. Then, in the hydrogen gas dissolution module 6, hydrogen gas is dissolved in the reverse osmosis water to produce water for preparing dialysate, which is then supplied to a dialysate supply device.

While detailed description has been made of the hydrogen gas dissolution apparatus 1 of the present invention, the present invention can be embodied in various forms without being limited to the above-described specific embodiment.

Namely, it is enough for the hydrogen gas dissolution apparatus 1 to comprises at least an electrolysis tank 4 having an anode chamber 40a for generating oxygen gas by electrolysis and a cathode chamber 40b for generating hydrogen gas by the above-said electrolysis, a hydrogen extracting pipe 8 for extracting the hydrogen gas from the cathode chamber 40b, an oxygen extracting pipe 7 for extracting the oxygen gas from the anode chamber 40a, a water supply pipe 3 for supplying water for electrolysis to the anode chamber 40a and the cathode chamber 40b, an opening pipe 81 for opening the cathode chamber 40b, a hydrogen gas dissolution module 6 connected to the hydrogen extracting pipe 8 to dissolve the hydrogen gas supplied from the hydrogen extracting pipe 8 by making it contact with water, a first open/close valve 91 installed on the water supply pipe 3, a second open/close valve 92 provided on the oxygen extracting pipe 7, a second open/close valve 93 provided on the opening pipe 81, and a control means 10 for controlling the electrolysis tank 7, the first open/close valve 91, and the second open/close valves 92, 93, wherein the control means 10 is configured to cause the water for electrolysis to flow into the anode chamber 40a and cathode chamber 40b by opening the first open/close valve 91 and the second open/close valves 92, 93, and then start the electrolysis after closing the first open/close valve 91 and the second open/close valves 92, 93.

EXPLANATION OF SYMBOLS

1: hydrogen gas dissolution apparatus
3: water supply pipe
4: electrolysis tank
5: water supply pipe (water supply means)
6: hydrogen gas dissolution module
7: oxygen extracting pipe
8: hydrogen extracting pipe
10: control means
40a: anode chamber
40b: cathode chamber
61: tube body
81: opening pipe
91: open/close valve
92: open/close valve
93: open/close valve
S5: water level sensor (first water level detection means)

The invention claimed is:

1. A hydrogen gas dissolution apparatus comprising:
an electrolysis tank having
an anode chamber for generating oxygen gas by electrolysis and
a cathode chamber for generating hydrogen gas by the electrolysis,
a hydrogen extracting pipe for extracting the hydrogen gas from the cathode chamber,
an oxygen extracting pipe for extracting the oxygen gas from the anode chamber,
a water supply pipe for supplying water for electrolysis to the anode chamber and the cathode chamber,
an opening pipe for opening the cathode chamber,
a hydrogen gas dissolution module connected to the hydrogen extracting pipe to dissolve the hydrogen gas supplied from the hydrogen extracting pipe by making it contact with water,
a first open/close valve installed on the water supply pipe,
a second open/close valve provided in each of the oxygen extracting pipe and the opening pipe, and
a control means for controlling the electrolysis tank, the first open/close valve, and the second open/close valves,
wherein
the control means causes the water for electrolysis to flow into the anode chamber and the cathode chamber by opening the first open/close valve and the second open/close valves, and then starts the electrolysis after closing the first open/close valve and the second open/close valves.

2. The hydrogen gas dissolution apparatus according to claim 1, wherein
at least one of the hydrogen extracting pipe and the oxygen extracting pipe is provided with a first water level detection means for detecting the water level in the pipe, and
the control means closes the first open/close valve and the second open/close valve when a rise in the water level in the pipe is detected by the first water level detection means, and starts the electrolysis.

3. The hydrogen gas dissolution apparatus according to claim 2, which is further provided with a water supply means for supplying the water to the hydrogen gas dissolution module, and
the water is supplied to the water supply pipe and the water supply means from a water source of the same system.

4. The hydrogen gas dissolution apparatus according to claim 3, wherein
the hydrogen gas dissolution module has a tube body for passing the water supplied from the water supply means, and
the tube body is composed of a porous membrane which allows the hydrogen gas to pass through.

5. The hydrogen gas dissolution apparatus according to claim 4, wherein
the porous membrane is a hollow fiber membrane.

6. The hydrogen gas dissolution apparatus according to claim 1, which is further provided with a water supply means for supplying the water to the hydrogen gas dissolution module, and
the water is supplied to the water supply pipe and the water supply means from a water source of the same system.

7. The hydrogen gas dissolution apparatus according to claim 6, wherein the hydrogen gas dissolution module has a tube body for passing the water supplied from the water supply means, and
the tube body is composed of a porous membrane which allows the hydrogen gas to pass through.

8. The hydrogen gas dissolution apparatus according to claim 7, wherein the porous membrane is a hollow fiber membrane.

* * * * *